United States Patent

[11] 3,593,603

| [72] | Inventor | Karoly Gellert |
| --- | --- | --- |
| | | Miskolc, Hungary |
| [21] | Appl. No. | 765,430 |
| [22] | Filed | Oct. 7, 1968 |
| [45] | Patented | July 20, 1971 |
| [73] | Assignee | Licencia Talalmanyokat Ertekesito Vallalat |
| | | Budapest, Hungary |

[54] TURNING MACHINE FOR MACHINING WORKPIECES OF MULTICONTOURED CONFIGURATIONS
1 Claim, 14 Drawing Figs.

| [52] | U.S. Cl. | 82/18 |
| --- | --- | --- |
| [51] | Int. Cl. | B23b 3/28 |
| [50] | Field of Search | 82/2, 18, 19; 90/11.62, 11.64 |

[56] References Cited

UNITED STATES PATENTS

| 934,863 | 9/1909 | Waern et al. | 82/18 X |
| --- | --- | --- | --- |
| 2,189,868 | 2/1940 | Hagerman | 82/18 |
| 3,391,586 | 7/1968 | Kieboom | 82/18 |
| 3,456,533 | 7/1969 | Firth et al. | 82/2 |

FOREIGN PATENTS

| 1,474,770 | 2/1967 | France | 82/18 |
| --- | --- | --- | --- |

*Primary Examiner*—Andrew R. Juhasz
*Assistant Examiner*—Leon Gilden
*Attorney*—Young and Thompson

ABSTRACT: A lathe for producing multicontoured workpieces comprises a working spindle and a tailstock for rotatably supporting opposite ends of the workpiece, the spindle and tailstock being independently mounted for rotation in a pair of eccentric sleeves whose adjustment about the axis of the workpiece alters the radius of rotation of the spindle and tailstock independently of each other.

INVENTOR
KÁROLY GELLÉRT

BY

ATTORNEYS

TURNING MACHINE FOR MACHINING WORKPIECES OF MULTICONTOURED CONFIGURATIONS

The invention relates to a turning machine, particularly a lathe, for machining the external and internal surfaces of multicontoured workpieces of arbitrary configurations in a manner resembling the conventional method of turning.

Developments in industry have created a demand for workpieces which have shapes other than purely cylindrical contours, particularly workpieces of configurations comprising convexly and concavely lobed, polygonally contoured and other complicated types of surface. The availability of such workpieces widens the scope of modern machinery and to some extent also permits simplifications in design. Nevertheless, such workpieces are not yet being used to the extent the advantages they afford would seem to justify because they are both difficult and awkward to produce and because qualitatively they fail to meet the required standards of accuracy, apart from the fact that they are expensive.

It has been proposed to produce such complicated contoured workpieces by machining them on a milling machine. However, the drawback of this method is that the several surfaces of the workpieces must each be separately set up and machined, and an indexing head must be used for machining such surfaces one by one. Moreover, workpieces of different shapes with differently contoured surfaces all require the provision of special milling cutters. T8e edges between two adjoining milled surfaces are not sharp but form fillets, so that shafts comprising sections of different diameters must be longer than would be actually necessary for fulfilling their purpose. This means that the entire machine containing such shafts must be larger overall. Such circumstances arise for instance in the case of shafts machined with collars, journal bearings and other integral elements.

It will be understood from what has been said that the production of multicontoured workpieces of complex shapes on a m9lling machine is a process requiring considerable labor and many tools. Very frequently another requirement that workpieces of complicated contours are intended to satisfy is that they should be produced in precisely fitting pairs, for instance in the form of die sets for presses. Sufficient precision cannot be assured by ordinary milling as machining by milling is incapable of providing a qualitatively satisfactory product.

For the production of complicated workpieces another previously proposed method consists of producing them with the aid of special master templates and tools. This method necessitates the provision, in respect of each workpiece of different shape, of a special master and possibly also a special set of tools. Such masters and special tools are also very expensive and the workpieces produced by such means are correspondingly costly. Their production is economical only when large numbers are needed, and this is rarely the case in industrial uses—even in mass production.

For the production of hollow workpieces which have complicated internal shapes neither milling nor copy machining from masters is a suitable method. These methods are not merely unsuitable because they are expensive, but also because they are unable to assure the necessary two- and three-dimensional precision. For the production of workpieces of this particular type, broaching tools are normally used. These are among the most expensive tools used for machining, and they have complicated profiles. Only very occasionally can they be used for large batch production. It will therefore be clear that broaching is too expensive a finishing operation, and that it excessively raises the production cost of such workpieces.

Apart from considerations of quality of the product and manufacturing cost which weigh heavily against milling, broaching or copy-milling from masters, there is also a secondary factor of which the importance must not be underestimated, that the skilled storage, maintenance and treatment of the large number of milling cutters, masters and broaching tools considerably add to the overhead in a machine shop.

It is therefore an object to the present invention to provide a machine which is suitable for machining both external and internal surfaces of multicontoured workpieces of arbitrary shapes in a manner resembling an ordinary turning operation, i.e. with a tool and with means similar to those provided on conventional lathes, and in a similar manner, with high precision and dimensional accuracy at an economical cost.

According to the present invention there is provided a turning machine for machining workpieces having multicontoured configurations, wherein the machine includes a working spindle mounted in the eccentric bore of an inner sleeve which is rotatable in the eccentric bore of an outer sleeve of the same eccentricity as the bore of the inner sleeve and which is adjustably lockable therein in any position, and wherein a tailstock center is mounted in rotatable inner and outer sleeves which are substantially of identical construction to the inner and outer sleeves containing the working spindle but which are rotatably adjustable and relatively lockable independently thereof.

The machine preferably includes a pair of sleeves each for mounting the working spindle and the tailstock center respectively, of which the latter sleeves are mounted for revolution together with the working spindle in either direction at a speed equal to or differing from that of the working spindle.

Finally a kinematic drive means of the machine may comprise a differential feed shaft operatively connected to a tool slide by transmission means, a differential gear associated with a worm gear between the main drive and a propeller shaft for rotating the working spindle through universal joints, a cross-shaft carrying differential pinions and attached transversely to the end of a shaft which for driving the propeller shaft passes through the center of a worm wheel connected to a crown wheel for common rotation therewith, and a gear transmission for operatively coupling differential feed shaft through coupling means to the worm of the worm gear.

In order to enable the invention to be more readily understood reference will now be made to the accompanying drawings, which illustrate diagrammatically and by way of example an embodiment thereof, and in which:

FIGS. 1 to 10 illustratively represent a number of workpieces which can be machined on a lathe in accordance with the present invention;

F(G. 11 illustrates the general disposition of eccentric sleeves in a lathe in accordance with the present invention, the outer and inner sleeves in the drawing being shown in their basic positions;

FIGS. 1 to 10 illustrate workpieces which can be machined on a lathe according to the invention. These illustrations are naturally merely representative of a large number of different shapes that can be machined. Not only the external surfaces of the workpieces can be machined to any desired complicated configuration, but also the internal surfaces and cavities, as well as the end faces.

Figure 1:
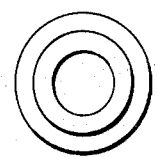
Figure 2:
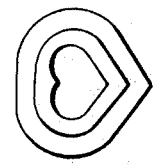
Figure 3:
Figure 4:
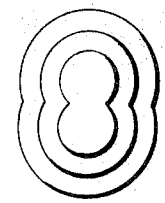
Figure 5:
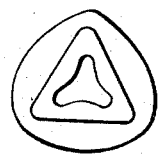
Figure 6:
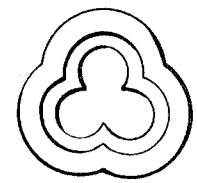
Figure 7:
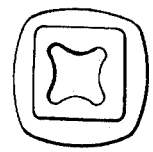
Figure 8:
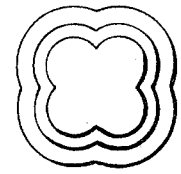
Figure 9:
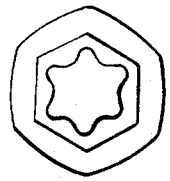
Figure 10:
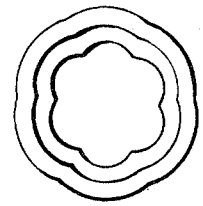
Figure 11:
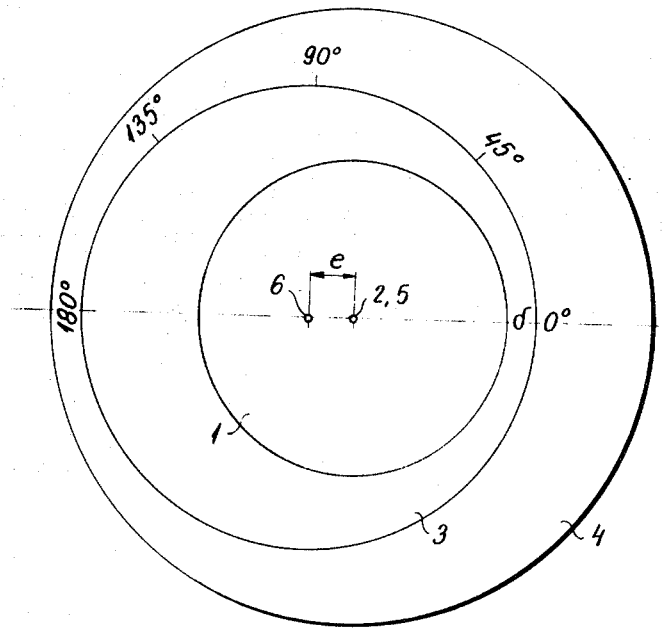

With reference to FIG. 11 there is shown a working spindle 1 which is rotatable about its center 2 in either direction and at any speed through the gearbox of the machine. The working spindle is mounted in the eccentric bore of an inner sleeve 3 which is itself turnable in the eccentric bore of an outer sleeve 4. The eccentricity of the bore in the inner sleeve 3 is equal to the eccentricity of the bore in the outer sleeve 4 and is indicated in the drawing at "$e$." In the position shown in FIG. 11, the center 2 of the working spindle 1 coincides with the center 5 of the outer sleeve 4. In other words, the position of the inner sleeve 3 in relation to the outer sleeve 4 is such that the center 2 of the working spindle 1, the center 6 of the inner sleeve 3 and the center 5 of the outer sleeve 4 lie in a straight line.

It will therefore be understood that in FIG. 11 the working spindle 1 is in that position which it would occupy if it were mounted in a concentric bore in the outer sleeve 4.

The working spindle 1 is assumed to c1rry a conventional chuck or collet for holding the workpieces.

Figure 12:
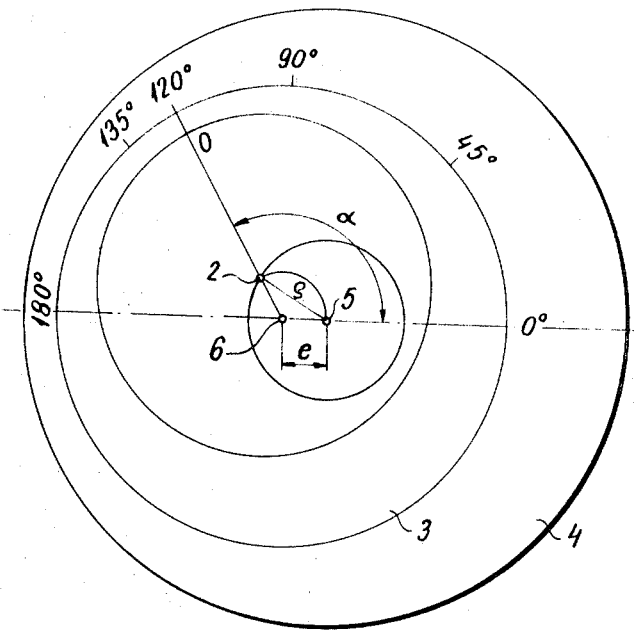
FIG. 12 shows the relative positions of the sleeve shown in FIG. 11 after adjustment.

In FIG. 12 the inner sleeve 3 has been rotated through an angle of 120° from t8e position it occupied in FIG. 11. When this has been done the three centers 2, 5 and 6 no longer lie in a straight line. The distance $p$ between the two centers 2 and 5 defines the difference between the largest and the smallest diameters of the multicontoured workpieces it is desired to machine. The distance between the centers 5 and 6 still equals the eccentricity "$e$."

In order to offset the spindle axis from the center of the outer sleeve by an amount $p$ the inner sleeve 3 must be rotated through a given angle. This angle can be read by reference to divisions provided around the end face of the bore in the outer sleeve 4. The angle required to provide a distance $p$ of offset is determined by the following formula:

$$\sin \frac{\alpha}{2} = \frac{\delta}{2e}$$

i.e.

$$\alpha = 2 \cdot \sin^{-1} \frac{\delta}{2e}$$

where $e$ is the design eccentricity characteristic of the machine in question, that is to say a constant.

After the inner sleeve 3 has been adjusted to the angle $\alpha$ that corresponds to the desired valve of $p$ the inner sleeve 3 and the outer sleeve 4 are locked together, so that they can then be rotated as one unit.

The adjustment of this angle is the first step required for setting up the lathe for a job.

Figure 13:
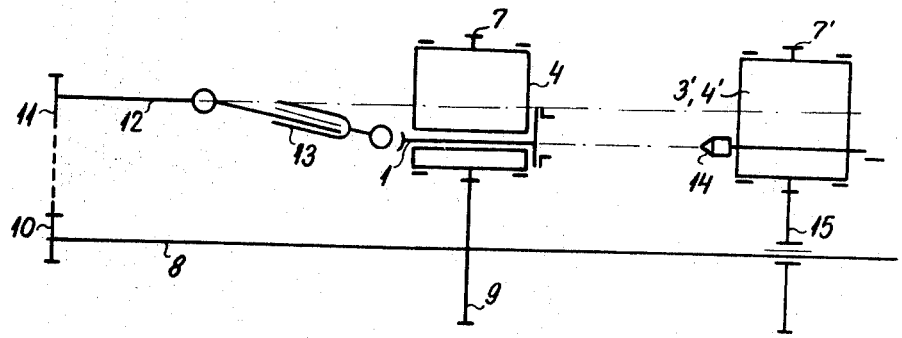
FIG. 13 is a diagram showing the general disposition of a working spindle and tailstock of a lathe in accordance with the present invention.

The outer sleeve 4 is rotatable by means of a gear ring 7 (FIG. 13) which firmly embraces the periphery of the sleeve. This gear ring 7 is in permanent mesh with a gearwheel 9 on a shaft 8. A gearwheel 10 on the shaft 8 is driven via any desired transmission means from a wheel 11 in the main transmission train of the lathe.

the shaft 12 of the gearwheel 11 is coupled to the working spindle by a drive shaft 13 and universal joints.

The outer sleeve 4 can be rotated in either direction at any selectable speed and the working spindle 1 can be simultaneously driven at any speed and in either direction. The speeds and directions of rotation of the working spindle 1 and of the outer sleeve 4 may be equal or they may differ. Adjustment for these speeds and for the directions of rotation are the second and third steps required in setting up the machine.

The described construction permits an adjustment to be so made that, for instance the working spindle 1 and hence the workpieces will perform one complete revolution about their axis whilst the outer sleeve 4 performs, say, four complete revolutions. Hence a tool provided in the path traversed by the sleeve will machine four congruent faces on the workpieces. In the method based on the manner of construction of the lathe, the workpiece is therefore rotated about its own axis whilst it simultaneously gyrates in an eccentric path to cooperate as many times as there are faces on the workpiece configuration it is desired to machine with a tool which is fixed or rather which performs the usual feed motions required for turning.

A tailstock center 14 which supports the end of the cylindrical workpiece remote from the chuck is mounted in sleeves 3', 4' contrived and disposed in a manner identical with the two sleeves 3 and 4 shown in FIGS. 11 and 12, but adjustable independently thereof, rotatable together with them. The outer sleeve 4' is rotatable through a gear ring 7' which is affixed thereto and embraces the same and which is in permanent mesh with a gearwheel 15 which is fast but longitudinally shiftable on the shaft 8.

The working spindle 1 and the tailstock center 14 align if the surface elements on the desired workpiece configuration are parallel with the longitudinal axis, i.e. if these faces are disposed along the generators of cylinders. If the workpieces taper or have other configurations, the tailstock center 14 is offset from the produced axis of the working spindle 1 according to the desired taper. In other words in such a case t8e relative angular adjustment of the two pairs of sleeves in which the working spindle 1 and the tailstock center 14 are mounted is d9fferent.

Figure 14:
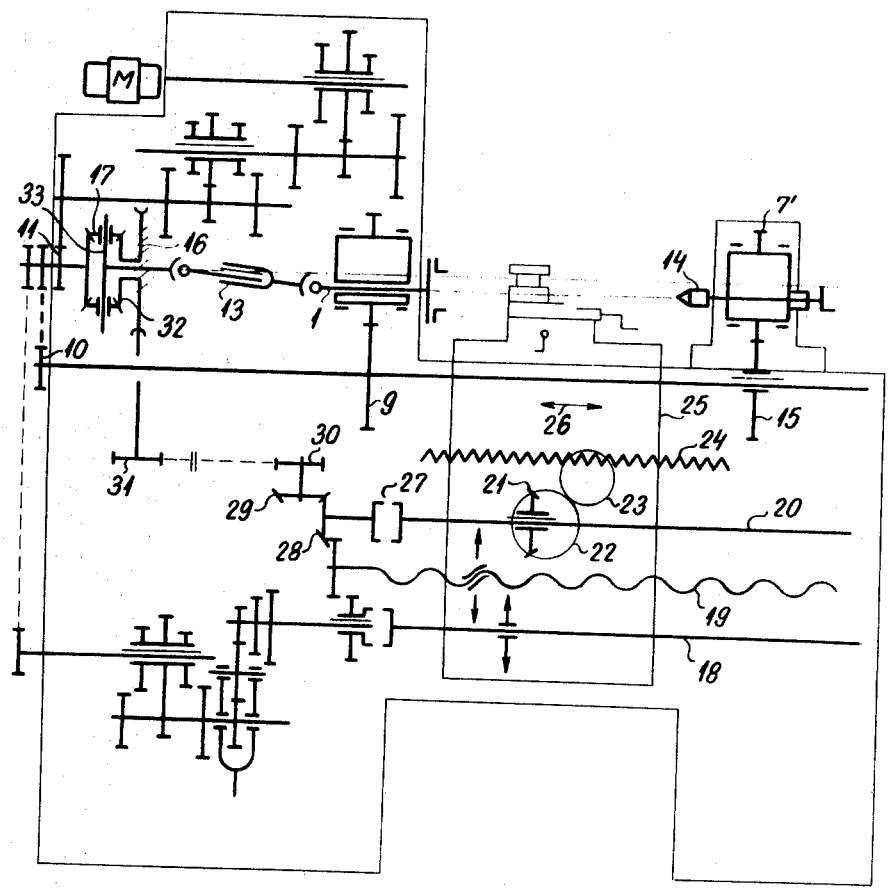
FIG. 14 schematically represents the kinematics of the lathe.

In the lathe shown in FIG. 14 there is further interposed, between the driving wheel 11 of the main transmission and the drive shaft 13, a differential gearing 17 combined with a worm gearing 16. The differential gearing 17 and the worm gearing 16 permit spiral surfaces to be machined.

For the purpose of machining such surfaces there is provided alongside a main input shaft 18 and a lead screw 19 a differential feed spindle 20 (hereinafter briefly referred to as the "feed spindle" 20). The feed spindle 20 is coupled by a pair of bevel wheels 21 and 22, gearwheel 23 and a rack 24 with a tool slide 25. When the tool slide 25 is fed in either of the directions of arrow 26 the feed spindle 20 also imparts rotation to the worm of the worm gearing 16 through the intermediary of a flexible coupling 27, a pair of bevel wheels 28 and 29 and a pair of change speed takeoff gears 30 and 31. The worm wheel of gearing 16 is fast with the crown wheel 32 of the differential gearing 17 and rotates together therewith. Consequently the crown wheel 32 will rotate when the tool slide 25 moves and will impart rotation to a shaft 33 through the differential pinions, thus also driving an adjoining shaft 13 and the working spindle 1.

If the main gearbox is in neutral and the tool slide 25 moves, then the above described gear connection will cause the working spindle 1 to rotate about its own axis, the two gearwheels 7 and 7' remaining stationary for the time being.

With the present lathe, any desired workpieces having a configuration comprising multicontoured external and internal surfaces can be machined in a qualitatively satisfactory manner, on one machine with the same tool, merely after appropriate adjustment of the machine which takes little time to complete. Production requires no costly tools, master templates and the like. Contoured pairs of workpieces, such as die sets and molds which it is desired to match can be machined with precision and to give a good fit. The machined workpieces may also be of generally tapering and slot shaped and the depth of the slots may be constant or varying along their length.

Furthermore an existing conventional lathe can be converted into a lathe according to the present invention for a relatively low investment cost.

Many modifications may be made to the present lathe and its components, and the latter may be replaced by equivalent means of similar function and effect but of different design. Moreover, the differential gearing 17 and the worm gearing 16 might be omitted since these are needed only for machining spiral surfaces. The kinematic layout of the machine may differ in detail from that shown in FIG. 14 and other modifications can be readily envisaged.

What I claim is:

1. A lathe for machining workpieces of multicontoured configuration, comprising a working spindle for rotatably supporting multicontoured end of a workpiece, a tailstock for rotatably supporting the other end of the workpiece, a lathe tool movable longitudinally along the workpiece between the working spindle and the tailstock to contour the workpiece, and means mounting said working spindle and tailstock for movement independently of each other about circular paths of variable radius, said mounting means for each of said working spindle and tailstock comprising a pair of eccentric sleeves one inside of the other and one pair rotatably supporting said working spindle and the other pair rotatably supporting said tailstock, said means for rotating said working spindle comprising an input shaft, a differential gear having an input gear rotatable with said input shaft, a plurality of differential pinion gears mounted on an output shaft of said differential gear and in mesh with said input gear, a crown gear in mesh with said pinions, a worm gear in unitary assembly with said crown gear, a worm in mesh with said worm gear, means drivingly interconnecting said output shaft with said spindle, and means drivingly interconnecting said worm with said lathe tool whereby movement of said lathe tool longitudinally of the workpiece rotates said worm.